United States Patent

[11] 3,612,674

| [72] | Inventor | Rikusaburo Sasaki<br>Hanno, Japan |
|---|---|---|
| [21] | Appl. No. | 834,849 |
| [22] | Filed | June 19, 1969 |
| [45] | Patented | Oct. 12, 1971 |
| [73] | Assignee | Hiraoka Kogya Kabushiki Kaisha<br>Hanno City, Saitama Prefecture, Japan |
| [32] | Priority | Nov. 21, 1968 |
| [33] | | Japan |
| [31] | | 43/84867 |

[54] IMAGE BLUR AND FILM DAMAGE PREVENTION DEVICE
1 Claim, 2 Drawing Figs.

[52] U.S. Cl. .................................................. 352/225
[51] Int. Cl. .................................................. G03b 1/48
[50] Field of Search .......................... 352/221–231;
353/95, 96

[56] References Cited
UNITED STATES PATENTS

| 1,966,683 | 7/1934 | Pollock .................... | 352/225 X |
| 2,451,161 | 10/1948 | Fairbanks .................. | 352/225 X |
| 2,457,913 | 1/1949 | Nemeth .................... | 352/225 X |

Primary Examiner—S. Clement Swisher
Attorney—Linton & Linton

ABSTRACT: The present image blur prevention device is for use on a movie projector having a mechanism for intermittently feeding a film and has a film passage to be positioned across the light path of the projector, provided by a fixed film guide and a movable film guide with a cam operable in relation to said projector intermittent film-feeding mechanism to press said movable film guide against said fixed film guide during the intermittent pauses in the feeding of the film.

PATENTED OCT 12 1971
3,612,674
FIG. 1.
FIG. 2.
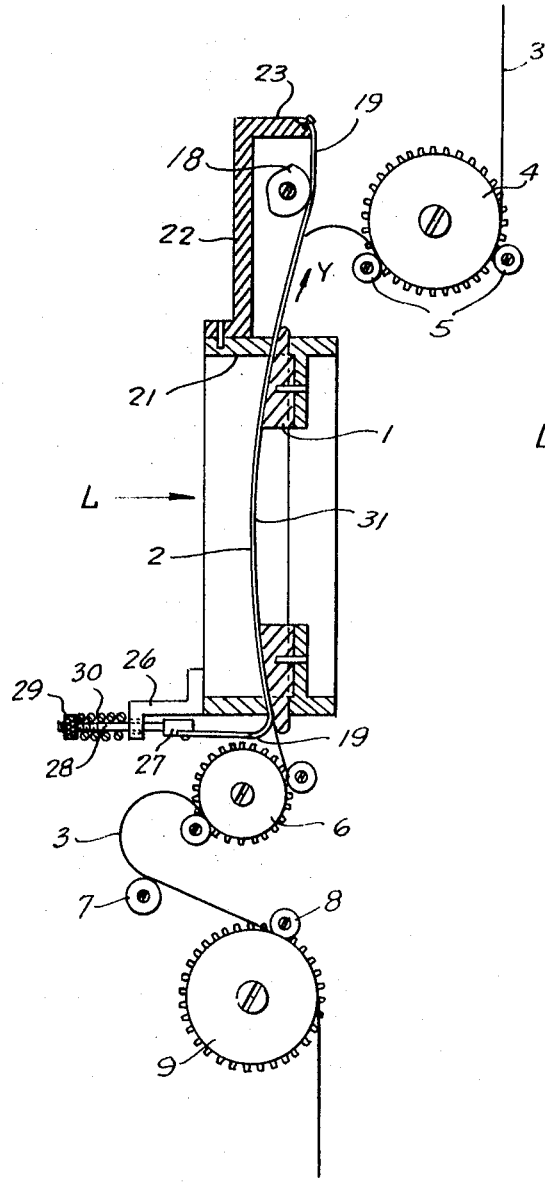
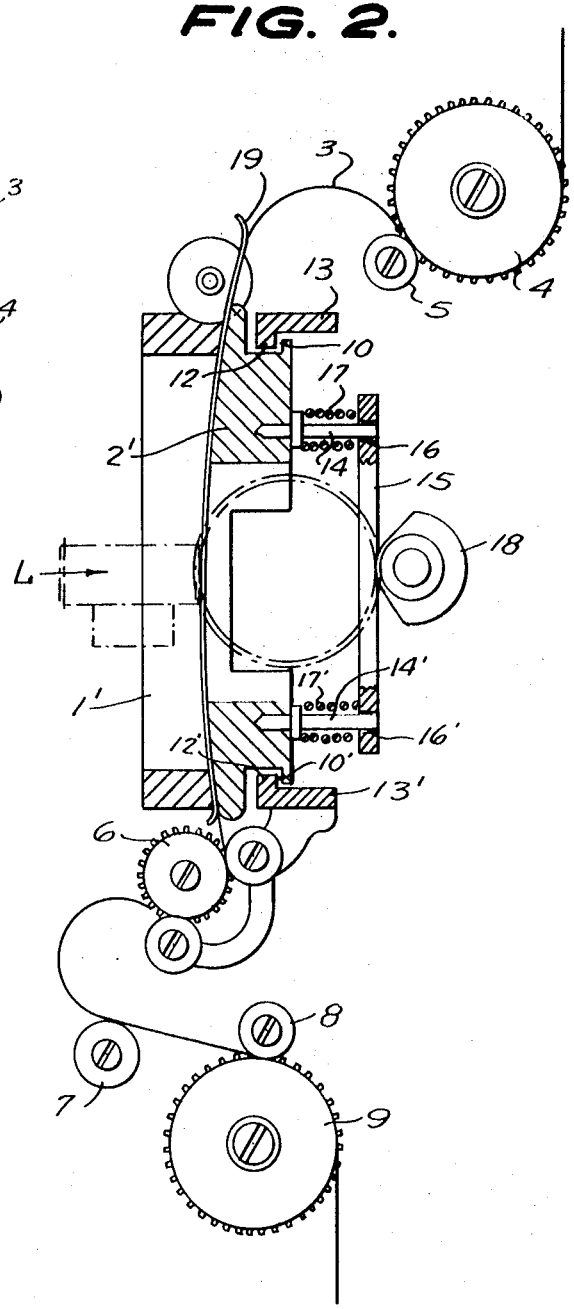
INVENTOR.
RIKUSABURO SASAKI
BY
Linton and Linton
ATTORNEYS.

IMAGE BLUR AND FILM DAMAGE PREVENTION DEVICE

SUMMARY OF THE INVENTION

The present invention is concerned with an image blur and film damage prevention device in the film feed mechanism of a movie projector employing a film exceeding a double frame in size.

With the recent introduction of supersize screens in movie theaters, instead of 35-mm., 70-mm. film has come to be adopted. Further, instead of five perforations, a frame of 70-mm. film has eight perforations to meet the increased size of the movie screen. In that case, however, a feed of a eight-perforation frame will be about 60 percent larger than that of a five-perforation one. On the other hand, this will make the pitch of one frame longer, therefore, the image will be blurred if the pressure at the film gate, which has been less than 250 g. under JIS, is not over 1,000 g., and as the result, a load falls on the perforated part of the film being fed and the possible film damage will be increased. Therefore, the feed mechanism must be specialized, or an image blur prevention device must be employed, when the conventional feed mechanism is adopted. The object of the present invention is to provide an image blur and film damage prevention device in the film feed mechanism for an outsize film as above mentioned. The subject matter of the present invention is represented by an image blur and film damage prevention device in the film feed mechanism of a movie projector employing a film exceeding a double frame in size, said device comprising a movable film-guide and a fixed film guide which cross the light path of the projector and jointly constitute the film passage, said movable film guide being elastically pressed against said fixed film guide at any intermittent pause of the intermittent film feed mechanism.

DESCRIPTION OF THE INVENTION

FIG. 1 shows a side view of the essential part of the image blur and film damage prevention device as one embodiment according to the present invention in the film feed mechanism of a movie projector employing a film exceeding a double frame in size, and FIG. 2 shows a side view of the essential part of the device of another embodiment according to the present invention.

To explain the structure of the device according to the present invention referring to the embodiment illustrated in FIG. 1, a fixed film guide 1 formed on the curved surface 31 is contacted with an elastic film gate plate 19 provided separately which serves as a movable film guide 2. The upper end of the film gate plate 19 is fixed to a jutting edge 23 of a frame 22 mounted above a machine frame 21, and the lower end of the film gate plate 19 is attached to a film gate fitting plate 27 at the end of a bolt 28 inserted into a bracket 26 projecting from the bottom of the machine frame 21. A coil spring 30 is inserted between an adjustment nut 29 screwed on the bolt 28 and the bracket 26, and the pressure between the film guide 1 and the film gate plate 19 which serves as a movable film guide, is regulated by the degree of tightening of the adjustment nut 29. Between the film guide 1 and the jutting edge 23 there is provided a cam 18 for engaging the film gate plate 19. The rotating relation between the cam 18 and the intermittent feed mechanism is such that the cam surface of the cam 18 comes to press the film gate plate 19 when the intermittent feed mechanism interrupts the film feeding intermittently.

Thus, the film gate plate 19 is moved in the direction of arrow Y. Meanwhile, since the film guide 1 is formed on the curved surface 31, the gate plate 19, tending to straighten itself while under tension presses against the fixed film guide 1. Under the above arrangement the film 3 passes between the guides 1 and 2, and after crossing the light path L goes between an intermittent rotation sprocket wheel 6 rotated intermittently by the intermittent feed mechanism (not shown) and the guide rollers 7, 8, and finally is taken up over a winding sprocket 9 by a winding reel.

Next, the composition of the second embodiment in FIG. 2 will be described. In FIG. 2 the same or similar elements as in the first embodiment are denoted by identical symbols.

In the second embodiment the movable film guide 2 is equipped with top and bottom recesses 10 and 10', which respectively engage with projections 12 and 12' on movable pieces 13, and 13' respectively, provided to separate the guide 2 from the guide 1 when the film is to be loaded.

Moreover, on the upper and lower portions of the movable guide 2 there are attached two guide bars 14 and 14'. A follow bar 15 slides on said guide bars and has holes 16 and 16' provided on its top and bottom therefor. The follow bar 15 is in contact with a cam 18 which rotates in a definite relationship with the rotation of the intermittent feed mechanism. Coil springs 17 and 17' are mounted on the guide bars 14 and 14' located between the follow bar 15 and the movable guide 2 and the springs 17 and 17' normally work to press the follow bar 15 to the cam 18. The rotating relation between the cam 18 and the intermittent feed mechanism is such that when the intermittent feed mechanism interrupts the film feed intermittently, the cam surface of the cam 18 presses the follow bar 15, and against the coil springs 17 and 17', the movable film guide 2 is pressed toward the fixed film guide 1, thereby the film being temporarily held tight between the curved surfaces of the guides 1, 2. Depending on the necessity, various devices for synchronizing the movements of the rotating shaft of the intermittent feed mechanism and the camshaft may be easily suggested, so the description is omitted.

Such being the compositions of the foregoing embodiments, when the intermittent feed mechanism interrupts the film feed intermittently, the movable film guide 2 is pressed to the fixed film guide 1 thereby reliably holding the film between the two guides, when the intermittent feed mechanism resumes the film feed, the movable film guide 2 separates itself from the fixed film guide 1 thereby allowing the film between them to pass easily without breaking the perforations.

Such being the effect of the composition according to the present invention, the film can be reliably held between fixed film guide 1 and movable film guide 2 at the intermittent pause of the intermittent film feed. Thus, even when the film feed tends to be enlarged under inertia, the film can be reliably halted when the feed is stopped, and accordingly, there is no likelihood of the image being blurred. Meanwhile, as there is no need for the film gate pressure to be maintained all the time at so high a value, there is no likelihood of the film being damaged.

I claim:

1. An image blur preventing device for use in a movie projector having a mechanism for intermittently feeding a film, comprising a movable film guide capable of being positioned to extend across the light path of the projector and having a fixed end and a free end, a fixed film guide capable of being positioned across the light path of the projector and with said movable film guide provide a film passage, resilient means connected to said moveable film guide free end tending to retain said free end from said fixed film guide and a cam positioned for engaging said movable film guide fixed end and capable of being rotated relative to the operation of the projector intermittent film-feeding mechanism whereby said cam will move said movable film guide to said fixed film guide when the film feed is intermittently interrupted.